July 18, 1933. R. W. SNYDER ET AL 1,918,572

BRAKE

Filed Oct. 21, 1930

Inventors
Robert W Snyder and
Meinderl Lammertse

By
Bee+Bush
Attorneys

Patented July 18, 1933

1,918,572

UNITED STATES PATENT OFFICE

ROBERT W. SNYDER AND MEINDERT LAMMERTSE, OF AKRON, OHIO, ASSIGNORS TO THE GOODYEAR TIRE & RUBBER COMPANY, OF AKRON, OHIO, A CORPORATION OF OHIO

BRAKE

Application filed October 21, 1930. Serial No. 490,188.

This invention relates to vehicle brakes and it has particular relation to an internal type of brake for landing gear of aircraft.

One object of the invention is to provide a brake particularly adapted to operate entirely within the boundaries of a wheel and thereby offering a minimum of wind resistance.

Another object of the invention is to provide an actuating mechanism for the braking elements which insures uniform application of the braking surfaces as well as a maximum braking engagement between such surfaces.

Another object of the invention is to provide a novel assembly of braking elements, all cooperating to secure maximum efficiency and simplicity of both operation and construction.

For a better understanding of the invention, reference may now be had to the accompanying drawing, forming a part of the specification, of which:

Figure 1:
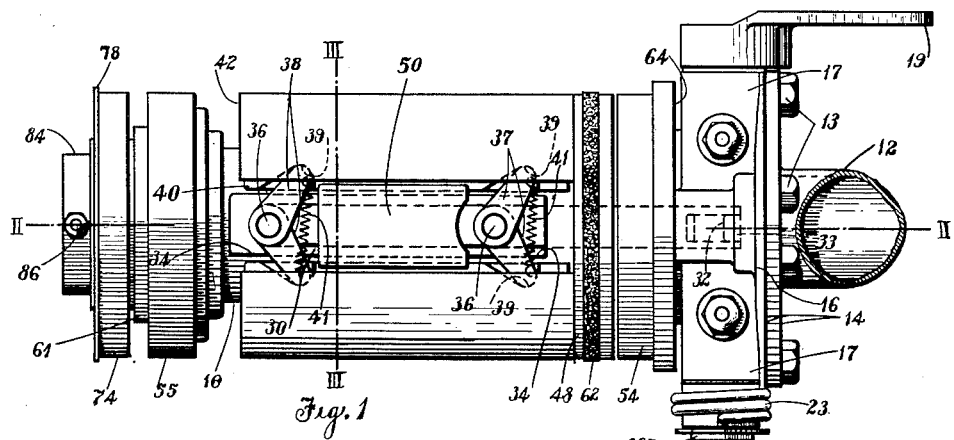
Fig. 1 is a plan view of a brake constructed according to the invention, the outside brake hub being omitted for the sake of clearness.

In practicing the invention, a brake carrier 10 is mounted upon an axle 11 of an aircraft landing gear 12 and is maintained rigidly thereon by means of bolts 13 extending through complementary flanges 14 of the carrier and axle.

Figure 2:
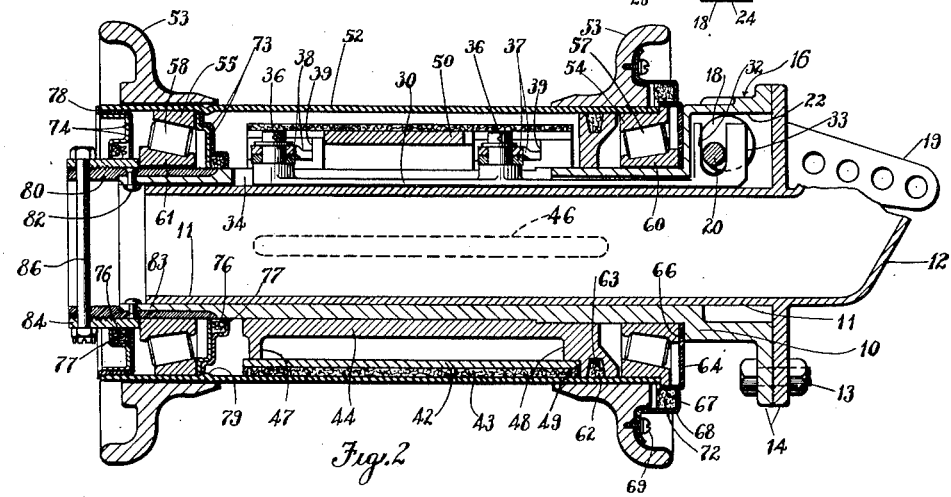
Fig. 2 is a cross-sectional view taken substantially along the lines II—II of Fig. 1.
Figures 3, 4:
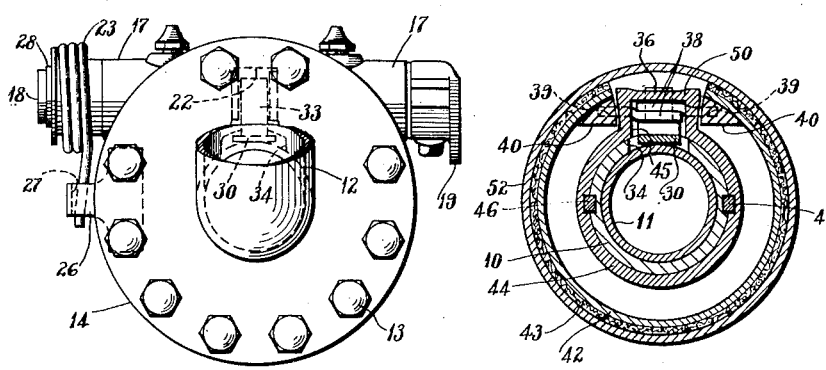
Fig. 3 is a cross-sectional view taken substantially along the lines III—III of Fig. 1.
Fig. 4 is an end elevational view of the brake shown by Fig. 2.

A housing 16, having oppositely disposed cylindrical end portions 17, is integral with the carrier and rotatably embraces opposite ends of a crank shaft 18, that has an actuating arm 19 secured to one end thereof, while a crank pin 20, constituting an intermediate eccentric portion of the shaft, is located in a central relatively large recess 22 of the housing. The other end of the crank shaft is provided with a torsion spring 23 having one end secured thereto, as indicated at 24. This spring, which is coiled about the end portion of the crank shaft, extends to a bracket 26 (Fig. 4) that is bolted to the flanges 14, and an opening 27 in the bracket receives the free end of the spring. Normally, the spring is under tension and tends to rotate the crank shaft in a clockwise direction, as viewed in Fig. 2. A flanged cap 28, secured upon the end of the crank shaft, maintains the spring in its proper position.

A flat actuating bar 30, having a notch 32 in an outer enlarged portion 33 thereof for receiving the crank pin 20, is disposed within an opening or slot 34 extending longitudinally in the brake carrier and is reciprocable axially along, and contacts with, the axle 11. Pins 36, secured to the bar 30, extend outwardly and pivotally support the inner ends of pairs of toggle links 37 and 38, the outer ends of which are rounded and are disposed within sockets 39 provided in lugs 40 at the opposite edge portions of a split cylindrical braking sleeve 42. In certain sizes of brakes, it is desirable to provide tension springs 41 connected at their opposite ends to the opposed edge portions of the braking sleeve 42. These springs aid in maintaining the braking sleeve in a retracted position. Conventional soldering or welding provides a firm union between the braking sleeve and the lugs. The sleeve is composed of suitable resilient material and is preferably covered with a brake lining 43.

A sleeve support 44, embracing the carrier 10 and the bar 30, is somewhat cylindrical in form and is keyed, as indicated at 46, to the brake carrier. In order to provide adequate space for the operation of the bar 30 and pins 36, slots 45 registering with the opening 34 are provided in the sleeve support.

Integral flanges 47 and 48 support the sleeve which is normally contracted under the influence of its resiliency and a radial shoulder 49 serves as an abutment to prevent axial displacement of the sleeve toward the crank shaft 18. The toggle links, under the influence of the coil spring 23, prevent axial displacement of the sleeve in the opposite direction.

An intermediate portion of the sleeve support is in the form of an outwardly projecting lug 50, which is located within the split of the braking sleeve and serves as an abutment against which the edges of the sleeve contact. Also, the lug prevents rotation of the sleeve about the axle.

By actuating the crank shaft 18, the toggle links expand the sleeve into braking engagement with the inner surface of a cylindrical hub barrel 52, that is provided with tire supporting flanges 53. Bearing rings 54 and 55 are secured to the inner surface of the hub barrel and engage roller bearings 57 and 58 which, in turn, are supported upon race rings 60 and 61 respectively that rigidly embrace the brake carrier. A packing ring or felt washer 62, disposed in an annular groove 63 of the flange 48, prevents lubricant from entering the portion of the hub barrel containing the toggle links and from affecting the brake lining. It will be observed that the axes of the roller bearings 57 and 58 respectively converge toward the axis of the axle 11. A ring 64, secured between the race ring 60 and a shoulder 66 of the carrier, is provided with a flange 67 overlapping the inner end portion of the hub barrel and serves to protect the bearings. A second protecting ring 68 secured, as indicated at 69, to the hub flange 53, embraces the ring flange 67, and a packing 72 is disposed between the rings 64 and 68 for protecting the bearings 57 and confining lubricant about the bearing.

Two pairs of rings 73 and 74, separated at their inner edges to provide annular packing grooves 76 having felt 77 or the like therein, aid in enclosing the bearings 58 within the outer end of the hub barrel and they are properly seated or located by means of a shoulder 78 engaging the end of the hub barrel and a bead or rib 79 disposed integrally about the inner circumference of the hub. A steel sleeve 80 is riveted, as indicated at 82, upon an outer reduced end portion 83 of the brake carrier 10, and a cap 84 is threaded upon the sleeve 80 for the purpose of facilitating assembly of the brake elements as well as maintaining them in assembled relation. In order to prevent displacement of the cap 84, a cotter pin or bolt 86 is disposed therethrough and through the steel sleeve 80.

From the foregoing description, it will be apparent that the brake is capable of efficient operation in conjunction with roller bearings without interfering with the latter or with the actuating bar 30, which slides within the space or slot 34 between the bearing rings and the axle. Likewise, approximately the entire surface of the braking sleeve functions against the inner braking surface of the hub barrel in either direction of rotation of the latter. This feature of the operation is facilitated by the fact that the edge portions of the split sleeve normally engage the rigid lug or abutment 50 in approximate alignment with the actuating toggle pivots 36. The toggle links, together with the bar 30, are capable of slight lateral movement for permitting lateral thrust of the braking sleeve to be absorbed entirely by the abutment.

Although we have illustrated only the preferred form of the invention and have described that form in detail, it will be apparent to those skilled in the art that the invention is not so limited but that various modifications may be made therein without departing from the spirit of the invention or from the scope of the appended claims.

What we claim is:

1. A wheel and brake assembly comprising a cylindrical hub, tire retaining flanges on said hub, said hub being adapted to directly support a tire, a split sleeve disposed within the hub, toggle links for expanding the sleeve into the braking engagement with the hub, and means for actuating the toggle links.

2. A brake comprising a cylindrical hub having an inner braking surface, a split sleeve mounted within the hub, toggle links engaging the sleeve for expanding it into braking relation against said braking surface, means operative in an axial direction of the hub for actuating the toggle links, and a crank shaft pivotally mounted transversely of and adjacent the hub and connected to said axially movable means.

3. A wheel and brake assembly comprising a cylindrical member, tire retaining flanges on said member, said member being adapted to directly support a tire, a split sleeve disposed therein, toggle links engaging the sleeve for expanding it into braking engagement with the cylindrical member, said sleeve having sockets therein for receiving the ends of the toggle links, and means for actuating the toggle links.

4. A brake construction comprising an axle, a brake carrier surrounding the axle, a crank shaft mounted in the carrier, an elongate member having toggle links thereon connected to the crank shaft, means for actuating the crank shaft, a split sleeve surrounding the carrier and engaging the toggle links, a member rigid with the axle projecting within the split of the sleeve, and a hub barrel surrounding the sleeve in braking relation when the toggle links are actuated.

5. A brake construction comprising a hub barrel having an inner braking surface, an axle disposed axially of the hub barrel, a brake carrier rigidly embracing the axle, a split sleeve mounted between the carrier and the hub barrel, toggle links engaging the opposed edges of the split sleeve to expand the latter into braking engagement with the hub barrel, and an actuating mechanism mounted in the brake carrier and connected to the toggle links.

6. A brake construction comprising a cylindrical hub barrel, an axle axially disposed within the hub barrel, a brake carrier mounted rigidly upon the axle, roller bearings supporting each end of the hub barrel upon the brake carrier, a split braking sleeve located between the bearings within the hub barrel, an elongate actuating member extending axially inside the bearing path in contact with the axle, and means connected to the actuating member to expand the sleeve into braking engagement with the hub barrel when the actuating member is drawn axially of the axle.

7. A brake comprising a cylindrical hub barrel, a housing disposed substantially concentrically within the hub barrel, bearings supporting each end of the hub barrel upon the housing, said housing having an axial slot inside the bearing path extending from one side of the bearings at one end of the hub barrel to a location within the latter, an elongate actuating member extending axially of the hub barrel within said slot, a split sleeve mounted within the hub barrel, a member rigidly mounted with respect to the housing and extending between the split portions of the sleeve, means connected to the actuating member for expanding the sleeve into braking engagement with the hub barrel when the actuating member is moved axially of the latter, a crank shaft for operating the actuating member and a torsion spring surrounding the crank shaft and connected to the housing for maintaining the shaft in an operative position.

8. A brake comprising a cylindrical hub, a split sleeve disposed within the hub, an actuating member extending axially into the sleeve, two pair of axially spaced toggle links pivotally connected to the member and extending angularly in opposite directions from the member into contact engagement only with the opposed edges of the split sleeve, means for actuating the member, a resilient means connecting the remote ends of the toggles for normally maintaining said ends in retracted position.

9. A brake comprising a cylindrical hub, a split sleeve disposed within the hub, a housing for supporting the sleeve within the hub, said housing including cylindrical bearing sockets disposed transversely of the axis of the hub, a crank shaft mounted in the sockets, an actuating bar having a notch for slidably receiving a portion of the crank shaft, and toggle links secured to the bar and engaging opposite edge portions of the split sleeve for actuating the sleeve into braking engagement with the hub, said housing having a slot for slidably receiving the bar adjacent the split portion of the sleeve.

10. A brake comprising a rotatable cylindrical hub, a split sleeve within the hub, actuating means for moving the sleeve into braking engagement with the hub, an axle, a brake carrier rigidly embracing the axle for supporting the sleeve against rotation, said carrier also supporting the hub and actuating means, and a cap secured upon the brake carrier for maintaining the hub and sleeve thereon independently of the axle.

11. A brake comprising a rotatable cylindrical hub, a split sleeve within the hub, actuating means for moving the sleeve into braking engagement with the hub, an axle, a brake carrier rigidly embracing the axle for supporting the sleeve against rotation, said carrier also supporting the hub and actuating means.

ROBERT W. SNYDER.
MEINDERT LAMMERTSE.